(12) United States Patent
Kawai

(10) Patent No.: US 7,079,302 B2
(45) Date of Patent: Jul. 18, 2006

(54) ELECTROPHORETIC DEVICE, HAVING AN OPENING

(75) Inventor: Hideyuki Kawai, Nagano-ken (JP)

(73) Assignee: Seiko Epson Corporation (JP)

( * ) Notice: Subject to any disclaimer, the term of this patent is extended or adjusted under 35 U.S.C. 154(b) by 673 days.

(21) Appl. No.: 10/224,635

(22) Filed: Aug. 19, 2002

(65) Prior Publication Data

US 2003/0058521 A1    Mar. 27, 2003

(30) Foreign Application Priority Data

Aug. 20, 2001  (JP)  .............................. 2001-249561
Aug. 14, 2002  (JP)  .............................. 2002-236516

(51) Int. Cl.
*G02B 26/00*  (2006.01)

(52) U.S. Cl. ...................... 359/296; 345/107; 430/32

(58) Field of Classification Search ................ 359/296, 359/228; 345/107; 430/32, 38; 264/4, 4.6; 349/86; 204/600

See application file for complete search history.

(56) References Cited

U.S. PATENT DOCUMENTS

| | | | | |
|---|---|---|---|---|
| 3,612,758 A | * | 10/1971 | Evans et al. ................. | 348/803 |
| 5,717,283 A | * | 2/1998 | Biegelsen et al. .......... | 313/483 |
| 6,067,185 A | | 5/2000 | Albert et al. | |
| 6,130,774 A | * | 10/2000 | Albert et al. ............... | 359/296 |
| 6,512,626 B1 | * | 1/2003 | Schmidt ..................... | 359/296 |
| 6,542,284 B1 | * | 4/2003 | Ogawa ....................... | 359/296 |
| 6,862,129 B1 | * | 3/2005 | Matsuda et al. ............ | 359/296 |

FOREIGN PATENT DOCUMENTS

JP   64-086116   3/1989

\* cited by examiner

*Primary Examiner*—Hung Xuan Dang
*Assistant Examiner*—Joseph Martinez
(74) *Attorney, Agent, or Firm*—Harness, Dickey & Pierce, P.L.C.

(57) ABSTRACT

An electrophoretic display device 20 of the present invention is formed of a first substrate 1, a second substrate 2, and microcapsules which are accommodated between these substrates and which contain an electrophoretic dispersion 10, wherein each of the microcapsules has an opening in at least a part thereof.

13 Claims, 14 Drawing Sheets

ELECTROPHORETIC DEVICE, HAVING AN OPENING

BACKGROUND OF THE INVENTION

1. Technical Field of the Invention

The present invention relates to electrophoretic devices and manufacturing methods therefor, and more specifically, relates to an electrophoretic device in which an electrophoretic dispersion containing a dispersion medium and electrophoretic particles is accommodated between electrodes opposing each other.

In addition, the present invention relates to various electronic apparatuses each provided with an electrophoretic display device incorporating the above electrophoretic device.

2. Description of the Related Art

Hitherto, concerning electrophoretic devices in which an electrophoretic dispersion containing a dispersion medium and electrophoretic particles is accommodated between a pair of electrodes, application thereof to electrophoretic display devices has been known in which change in distribution of the electrophoretic particles caused by a voltage applied between the pair of substrates is used. FIG. 3(a) is a view showing the general structure of an electrophoretic display device to which an electrophoretic device is applied.

This electrophoretic display device 20 is composed of an electrode 3 formed on a first substrate 1, a transparent electrode 4 formed on a second substrate 2, an electrophoretic dispersion 10 filled between the electrode 3 and the transparent electrode 4, and a spacer 7 for preventing this electrophoretic dispersion 10 from flowing out. This figure shows a cross-section of one pixel of the display device.

The electrophoretic dispersion 10 is composed of a liquid-phase dispersion medium 6 and electrophoretic particles 5 dispersed in this liquid-phase dispersion medium 6. In addition, the liquid-phase dispersion medium 6 and the electrophoretic particles 5 are colored in different colors from each other.

To this electrophoretic display device 20, voltage sources 9a and 9b, which apply voltages in the direction opposite to each other, are connected via a switch 8. That is, the electrode 3 is connected to one end of each of the voltage sources 9a and 9b, and the electrode 4 is connected to the other end of each of the voltage sources 9a and 9b via the switch 8. When connection is formed as described above, by switching the switch 8, the direction of a voltage to be applied can be changed. By changing the direction of a voltage to be applied, the electrophoretic particles can be gathered at a desired electrode side, thereby performing a desired display.

That is, when the electrophoretic particles 5 are positively charged, as shown in (b) of the same figure, by applying a voltage of the voltage source 9a, the electrophoretic particles 5 can be gathered at the transparent electrode 4 side which is disposed close to an observer. In the state described above, the observer can view the color of the electrophoretic particles 5. On the other hand, as shown in (c) of the same figure, by applying a voltage of the voltage source 9b, the electrophoretic particles 5 can be gathered at the electrode 3 side which is disposed far from the observer. In the state described above, the observer views the color of the liquid-phase dispersion medium 6. When the electrophoretic particles 5 are negatively charged, the moving direction of the particles is opposite to that described above.

As described above, when the structure shown in FIG. 3(a) is employed, since two types of colors can be displayed in accordance with the direction of a voltage to be applied, an electrophoretic display device capable of displaying a desired image can be realized when the structure shown in the figure is disposed in every pixel.

In addition, an electrophoretic device having the structure in which an electrophoretic dispersion is enclosed in microcapsules has been known. When the device is thus formed, agglomeration of the electrophoretic particles and adhesion thereof to electrodes can be dissolved, and at the same time, handling of the dispersion system can be significantly improved during assembly.

However, in the case in which an electrophoretic dispersion is enclosed in microcapsules, gaps are formed between the capsules since the microcapsule has a spherical shape, and wall films of the microcapsules are not completely transparent, resulting in decrease in image contrast.

As means for solving the problems described above, for example, there has been a known technique for deforming microcapsules into a non-spherical shape. However, even when this technique is employed, it is difficult to totally eliminate gaps formed between the microcapsules, and the problem of presence of the microcapsule wall films cannot be dissolved.

The present invention was made in order to solve the shortcomings of the traditional technique described above, and a first object thereof is to provide an electrophoretic device and a manufacturing method therefor, in which a dispersion system is easily handled during assembly, and image contrast can be significantly improved.

A second object of the present invention is to provide an electronic apparatus incorporating a display device, in which image contrast can be significantly improved even when the display device is an electrophoretic display device.

SUMMARY OF THE INVENTION

In order to solve the problems of the traditional techniques described above and to achieve the first object described above, an electrophoretic device of the present invention comprises a first substrate;
a second substrate opposing the first substrate; and
a plurality of capsules which are provided between the first substrate and the second substrate and which contain a dispersing medium and electrophoretic particles;
wherein the capsules each have an opening formed in at least a part thereof.

According to the structure as described above, since the opening is formed in at least a part of the capsule, decrease in image contrast caused by gaps formed between the capsules and the capsule wall films can be dissolved.

In the case described above, the capsules may have an average volume particle diameter of approximately 5 to 300 µm. When the particle diameter is less than 5 µm, since the layer of a colored dispersion medium becomes thin, satisfactory contrast may not be obtained in some cases.

When the particle diameter is more than 300 µm, mechanical strengths of the capsule may be decreased, or since it becomes necessary to increase a driving voltage applied between the electrodes, increase in running cost may occur in some cases.

In addition, the capsule wall film may have a thickness of approximately 0.1 to 5 µm. When the thickness is less than 0.1 µm, satisfactory mechanical strengths may not be obtained in some cases, and when the thickness exceeds 5 µm, the transparency of the wall film is decreased, and hence the contrast may be decreased in some cases.

Furthermore, the content of the capsules in a resin composition (coating agent) may be set in the range from 30 to 80 wt %. When the content is less than 30 wt %, voids are formed between the capsules, and hence decrease in contrast or display defects may occur in some cases. In addition, when the content is more than 80 wt %, agglomeration of the capsules occurs in the resin composition, and hence coating defects, damages to the capsules, or display defects may occur in some cases.

The electrophoretic device of the present invention may further comprise a binding agent around the peripheries of the capsules. In particular, the binding agent is characterized in having one or more features among transparent, adhesive, plastic, flexible, and insulating properties. By using the binder having the features mentioned above, the image contrast can be further improved.

In addition, in the electrophoretic device of the present invention, an opening portion formed in each of the capsules is in contact with at least one of the first substrate and the second substrate. In this case, the substrate in contact with the opening portions serves as lids therefor, and hence the dispersion medium and the electrophoretic particles are prevented from flowing out from the capsules. In addition, in particular, when the openings faces in the direction parallel to that of an electric field in which the electrophoretic particles are moved, resistance components or capacitance components in voltage application can be removed or decreased, and hence superior efficiency can be obtained. That is, the dielectric capsule wall films may function as a resistance component or a capacitance component; however, when the opening portions of the capsules are formed in the direction parallel to that of the electric field, the resistance component or the capacitance component is reduced, and hence voltage application can be effectively performed.

In the electrophoretic device of the present invention, the diameter in a perpendicular direction with respect to the first substrate and the second substrate may be smaller than that in the horizontal direction. In particular, the diameter in the perpendicular direction may be set to approximately 15 to 80 μm, and the diameter in the horizontal direction may be set to approximately 50 to 200 μm.

In the electrophoretic device of the present invention, the first substrate has light transmissive properties, and the opening portions are provided at the first substrate side. In addition, in particular, openings may not be provided in parts of the capsules at the second substrate side. Accordingly, for example, when the first substrate side is used as a viewing side, the visibility of the electrophoretic device is improved. In particular, by forming the opening portions at the viewing side, the gaps between neighboring capsules disposed at the viewing side are unlikely to be formed, conventional defects such as contrast decrease by light leakage caused by the presence of the gaps can be avoided or suppressed.

In addition, a first electrode may be formed at the internal surface side of the first substrate, and an insulating film may be formed between the first electrode and the opening portions of the capsules. In this case, since the electrophoretic particles are not brought into direct contact with the first electrode, defects such as adhesion of the electrophoretic particles to the electrode can be avoided or suppressed. Furthermore, a color layer may be further provided between the opening portions and the first substrate. Accordingly, color display having high color purity can be realized.

Next, to achieve the objects described above, according to the present invention, an electrophoretic device having scanning lines, signal lines, and switching elements provided at respective intersections therebetween, comprises:

a first substrate;

a second substrate which is disposed opposing the first substrate and on which the switching elements are provided; and capsules which are provided between the first substrate and the second substrate and which contain a dispersion medium and electrophoretic particles;

wherein the capsules each have an opening formed in at least a part thereof.

According to the electrophoretic device as described above, the first substrate side on which the switching elements are not formed may be used as a viewing side, and since the opening is formed in at least a part of each capsule which is at the substrate side, decrease in image contrast caused by gaps formed between the capsules and by the capsule wall films can be dissolved. In this case, on the second substrate, pixel electrodes connected to the switching elements may be provided, and on the first substrate, a counter electrode opposing the pixel electrodes may be provided. In the structure described above, the counter electrode is preferably formed of a material having light-transmissive properties.

Next, an electronic apparatus of the present invention, which has an image display portion, comprises the above electrophoretic device as the image display portion. According to this structure, in the electrophoretic device forming the image display portion, image contrast can be significantly improved.

Next, a method for manufacturing the electrophoretic device described above, comprises: a step of enclosing a dispersion medium and electrophoretic particles in capsules; and a step of forming an opening portion in at least a part of each of the capsules. In the manufacturing method for the electrophoretic device, according to the present invention, as described above, since the opening is formed in each capsule after the dispersion medium and the electrophoretic particles are enclosed in the capsules, handling of the dispersion system during assembly becomes easier. In addition, by forming the opening in each capsule, decrease in image contrast caused by gaps formed between the capsules and by the capsule wall films can be dissolved.

In addition, a method for manufacturing an electrophoretic device, according to the present invention, comprises: a step of enclosing a dispersion medium and electrophoretic particles in capsules; a step of accommodating the capsules between a first substrate and a second substrate after the enclosure; and a step of forming an opening portion in at least a part of each of the capsules after the accommodation. In this case, the capsules may be accommodated together with a binding agent between the first and the second substrates. As described above, when the binding agent is used, the capsules can be easily accommodated or disposed, and in addition, the dispersion medium or the like can be prevented from flowing out from the capsules after the openings are formed therein.

Furthermore, a method for manufacturing an electrophoretic device, according to the present invention, comprises: a step of enclosing a dispersion medium and electrophoretic particles in capsules; a step of disposing the capsules on at least one of a first substrate and a second substrate after the enclosure; a step of forming an opening portion in at least a part of each of the capsules after the disposition; and a step of providing the other substrate on the substrate on which the capsules are disposed. In this case, the capsules may be disposed together with a binding agent on at least one of the first and the second substrates. According to the methods described above, the electrophoretic devices of the present invention can be provided.

In the method described above for manufacturing the electrophoretic device, the step of forming the openings in the capsules may comprise an opening step performed by using one or more tools selected among heat, mechanical stress, light, sonic waves, solvents, and corrosive gases. By using the tools described above, the openings can be reliably and rapidly formed in the capsules.

In addition, the binding agent may have one or more properties among volatility, contractility, plasticity, and flexibility. By using the binding agent described above, the openings can be reliably formed in the capsules, and in addition, the image contrast can be further improved.

DETAILED DESCRIPTION OF THE PREFERRED EMBODIMENTS

Figure 1:
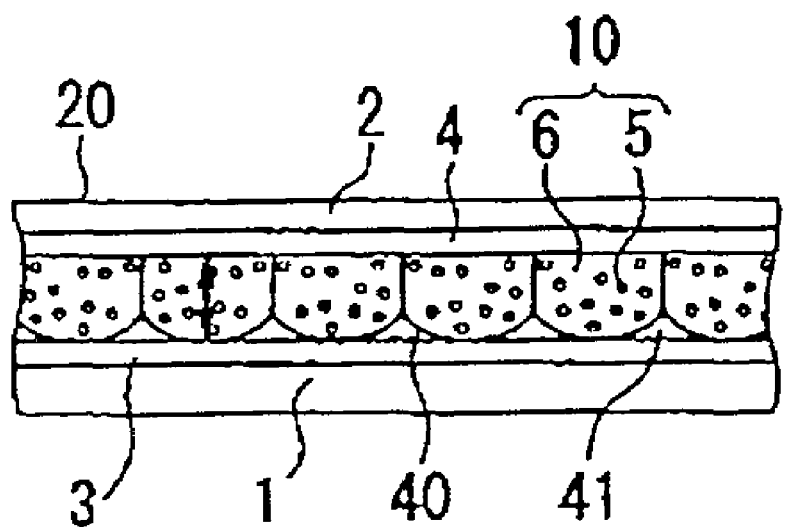
FIG. 1 is a cross-sectional view showing the structure of an electrophoretic device according to a first embodiment of the present invention.

Next, with reference to drawings, embodiments of the present invention will be described. In respective drawings cited in the following description, the same reference numerals of elements in one drawing designate the same elements.

EXAMPLE 1

FIG. 1 is a cross-sectional view showing the structure of a first embodiment in which an electrophoretic device of the present invention is applied to an electrophoretic display device. As shown in the figure, an electrophoretic display device 20 of the present invention has a first substrate 1 and a second substrate 2, and the second substrate 2 side is used as an observer side. The second substrate 2 is formed of a light transmissive plate such as a transparent glass or a transparent film. On a surface of the second substrate 2 opposing the first substrate 1, a transparent electrode 4 film is formed. The transparent electrode 4 is formed, for example, of indium tin oxide (ITO) film.

Although being not always necessary to be transparent, the first substrate 1 is formed, for example, of a glass substrate or a film substrate. In addition, on a surface of the first substrate 1 opposing the second substrate 2, an electrode 3 is formed. Although being not always necessary to be transparent, the electrode 3 is formed, for example, of an ITO film.

For ease of illustration in FIG. 1, the electrodes 3 and 4 are each not divided; however, for example, each of them may be divided into a pattern to form a segment type display device. By dividing each electrode to form an appropriate pattern, a desired image can be displayed.

Between the electrodes 3 and 4, an electrophoretic dispersion 10 is accommodated together with a binder 41 and microcapsule wall films 40. The electrophoretic dispersion 10 is formed of at least a liquid-phase dispersion medium 6 and electrophoretic particles 5 dispersed in this liquid-phase dispersion medium 6.

The microcapsule wall film 40 has an opening in the wall film of a microcapsule in which the electrophoretic dispersion 10 was originally (primarily) enclosed, the opening being formed by an optional tool such as heat, mechanical stress, light, sonic waves, solvents, or corrosive gases in a part of the wall film which is in contact with the electrode 4.

In this embodiment, since an electric field is applied in the longitudinal direction (direction shown by the arrow in the figure) between the electrode 3 and the electrode 4, and the electrophoretic particles 5 move in this electric field direction, the structure is formed so that reverse display can be performed.

As described above, since the opening is formed in the wall film of each microcapsule at the observer side, the gaps formed between the microcapsules can be decreased, and the wall films at the observer side can be removed, the image contrast can be significantly improved.

As the liquid-phase dispersion media 6, there may be mentioned alcohol solvents, such as water, methanol, ethanol, isopropanol, butanol, octanol, and methyl cellusolve;

various esters such as ethyl acetate and butyl acetate; ketones, such as acetone, methyl ethyl ketone, and methyl isobutyl ketone; aliphatic hydrocarbons, such as pentane, hexane, and octane; alicyclic hydrocarbons, such as cyclohexane and methylcyclohexane; aromatic hydrocarbons including benzene derivatives having a long alkyl chain, such as benzene, toluene, xylene, hexylbenzene, heptylbenzene, octylbenzene, nonylbenzene, decylbenzene, undecylbenzene, dodecylbenzene, tridecylbenzene, and tetradecylbenzene; halogenated hydrocarbons, such as methylene chloride, chloroform, carbon tetrachloride, and 1,2-dichloroethane; carboxylates; and other various fatty compounds. Together with a surfactant or the like, these mentioned above may be used alone or in combination.

In addition, the electrophoretic particle 5 is an organic or inorganic particle (polymer or colloid) having properties of being moved in a dispersion medium by electrophoresis in accordance with a potential difference.

As the electrophoretic particles 5, for example, there may be mentioned black pigments, such as aniline black and carbon black; white pigments, such as titanium dioxide, zinc flower, and antimony trioxide; azo-based pigments, such as monoazo, disazo, and polyazo compounds; yellow pigments, such as isoindolinone, chrome yellow, iron oxide yellow, cadmium yellow, titanium yellow, and antimony; azo-based pigments, such as monoazo, disazo, and polyazo compounds; red pigments, such as quinacridone red and chrome vermillion; blue pigments, such as phthalocyanine blue, indanthrene blue, anthraquinone-based dyes, iron blue, ultramarine blue, and cobalt blue; and green pigments such as phthalocyanine green. These mentioned above may be used alone or in combination.

Furthermore, to the pigments described above, whenever necessary, charge control agents in the form of particles composed of electrolytes, surfactants, metallic soaps, resins, rubbers, oils, varnishes, or compounds; dispersing agents, such as titanium-based coupling agents, aluminum-based coupling agents, and silane-based coupling agents; lubricants; stabilizers; and the like may be added.

As a material for forming the microcapsule wall film 40, for example, a gum arabic-gelatin-based composite film, or a compound of a urethane resin, urea resin, or urea-formaldehyde resin may be used.

As the binder 41, a material having a superior affinity for the microcapsule wall film 40, adhesion to a base material, and insulating properties may be used. For example, preferably used are thermoplastic resins, such as polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chlorideacrylonitrile copolymer, ethylene-vinyl alcohol-vinyl chloride copolymer, propylene-vinyl chloride copolymer, vinylidene chloride resin, vinyl acetate resin, poly(vinyl alcohol), poly(vinyl formal), and cellulose-based resin; polymers, such as polyamide resin, polyacetal, polycarbonate, poly(ethylene terephthalate), poly(butylene terephthalate), poly(phenylene oxide), polysulfone, poly(amide imide), poly(amino bismaleimide), poly(ether sulfone), poly(phenylene sulfone), polyarylate, grafted poly(phenylene ether), poly(ether ether ketone), and poly(ether imide); fluorinated resins, such as poly(tetrafluoroethylene), poly(fluoroethylene propylene), tetrafluoroethylene-perfluoroalkoxy-ethylene copolymer, ethylene-tetrafluoroethylene copolymer, poly(vinylidene fluoride), poly(chlorotrifluoroethyelene), and fluorinated rubber; silicon-based resins, such as organic silicone resin and silicone rubber; and others, such as methacrylic acid-styrene copolymer, polybutylene, and methyl methacrylate-butadiene-styrene copolymer.

In addition, a binding agent used in the electrophoretic device of the present invention preferably has one or more features among transparent, tacky, volatile, contractive, plastic, flexible, insulating properties. By using the binding agent having the properties mentioned above, the opening of the microcapsule can be reliably formed, and in addition, the image contrast can be further improved.

In addition, as for the binding agent, it is preferable that the dielectric constant of an electrophoretic display solution be approximately equivalent to that of a dispersing agent. Accordingly, for example, alcohols, ketones, or carboxylic salts are preferably further added to the binder resin composition mentioned above. As the alcohols mentioned above, 1,2-butanediol, 1,4-butanediol, or the like may be used.

Figure 3:
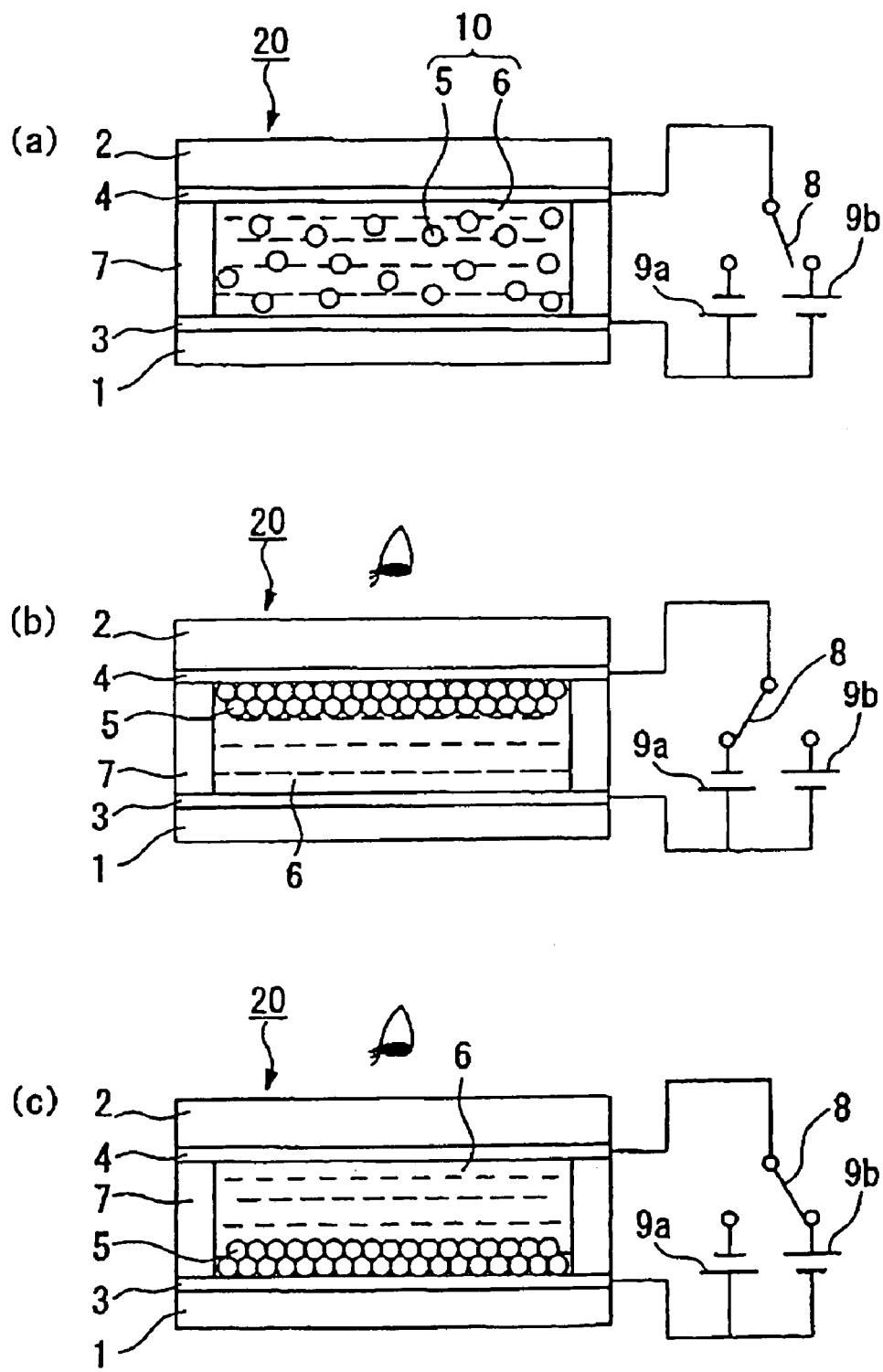
FIG. 3 includes views showing general examples of an electrophoretic display device, (a) is a cross-sectional view of the structure thereof, and (b) and (c) are views for illustrating an image display principle.

In the electrophoretic display device 20 having the structure described above, as shown in FIG. 3(a), the voltage source 9a or 9b is applied between the electrodes 3 and 4 by switching the switch 8.

Figure 2:
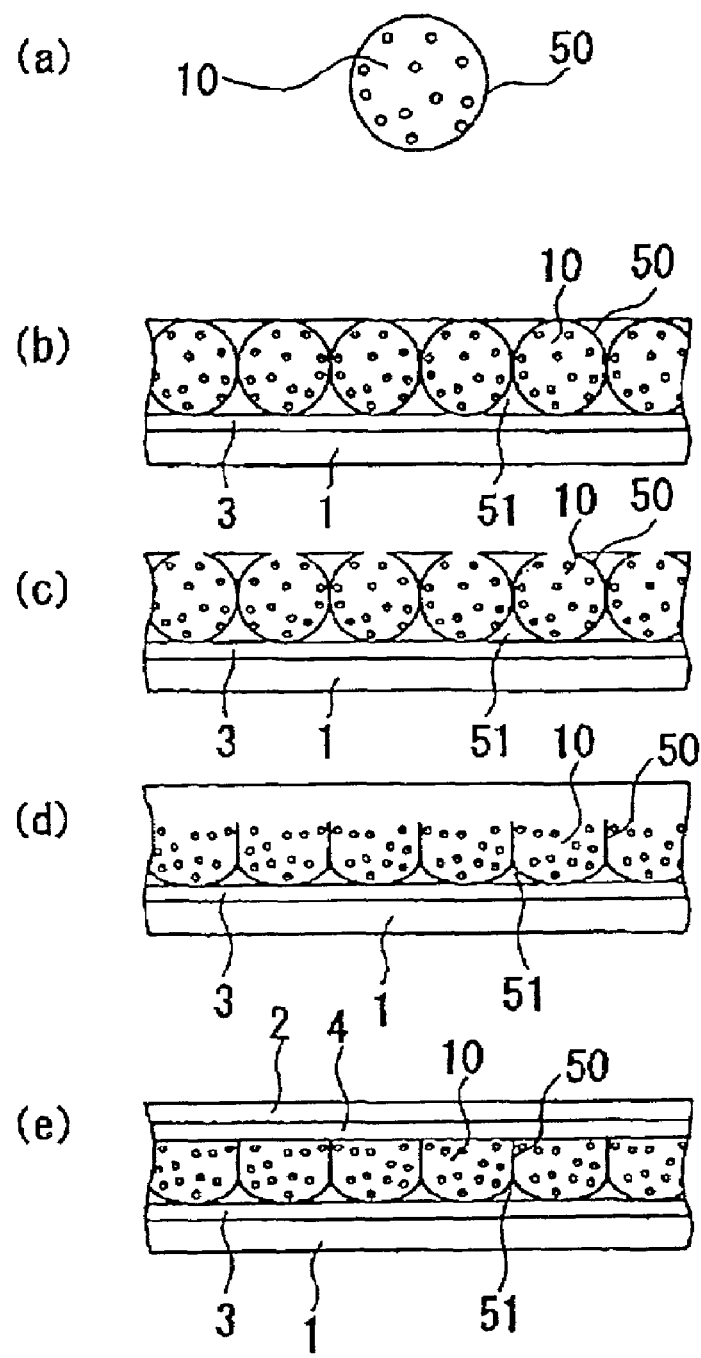
FIG. 2 includes views for illustrating steps of a manufacturing method for an electrophoretic device of the present invention.

Next, an example of a method for manufacturing an electrophoretic display device having the structure as described above will be described with reference to FIG. 2.

As shown in (a) of the same figure, the electrophoretic dispersion 10 is first enclosed in a microcapsule 50. As this enclosing step, a known microcapsule forming technique, such as interfacial polymerization, in-situ polymerization, phase separation, interfacial precipitation, or spray drying, may be used.

In this enclosing step, a wall film material is optionally selected in consideration of a wall film opening technique performed in a subsequent step. For example, in the case in which the opening is performed by using heat or light, a material having a solubility enhanced by heat or light may be selected; in the case in which the opening is performed by using mechanical stress or sonic wave, a material having appropriately weak mechanical strength is selected; in the case in which an opening technique using a solvent is employed, a material soluble in a solvent to be used is selected; and in addition, in the case in which an opening technique using a corrosive gas is employed, a material which is corroded by a gas to be used is selected.

Subsequently, a number of the microcapsules 50 formed as described above are mixed with a binding agent 51, and in addition, when it is desired, a dielectric constant adjuster may also be added thereto. Next, as shown in (b) of the same figure, the resin composition (emulsion or solution containing an organic solvent) thus formed is applied onto the electrode 3 by a known coating method, such as a roller coating method, roller lamination method, screen printing method, spray method, or ink-jet method.

In the step described above, the binding agent 51 having suitable properties is selected in consideration of a binder contraction technique performed in a subsequent step. For example, in the case in which the contraction is performed by evaporation of a solvent, a material having volatility is selected; in the case in which the contraction is performed by using heat or light, a material having heat-shrinkable or light-shrinkable properties is selected; and in the case in which the contraction is performed by using a mechanical stress, a material having plasticity is selected.

Figure 17:
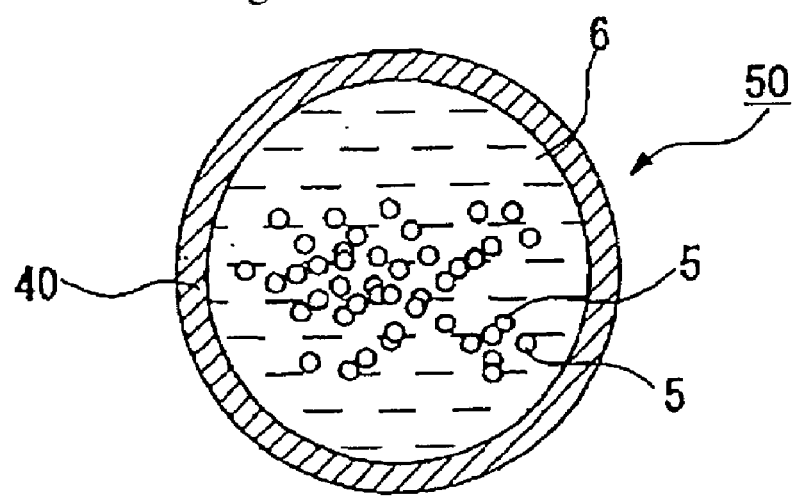
FIG. 17 is a cross-sectional view showing the structure of a microcapsule applicable to an electrophoretic display device of the present invention.
Figure 18:
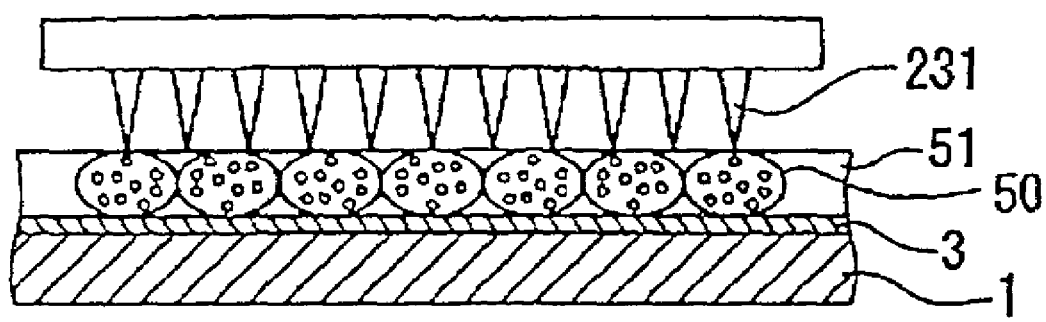
FIG. 18 is a schematic view showing a part of a manufacturing apparatus for use in a step of manufacturing the electrophoretic device shown in FIG. 1.
Figure 19:
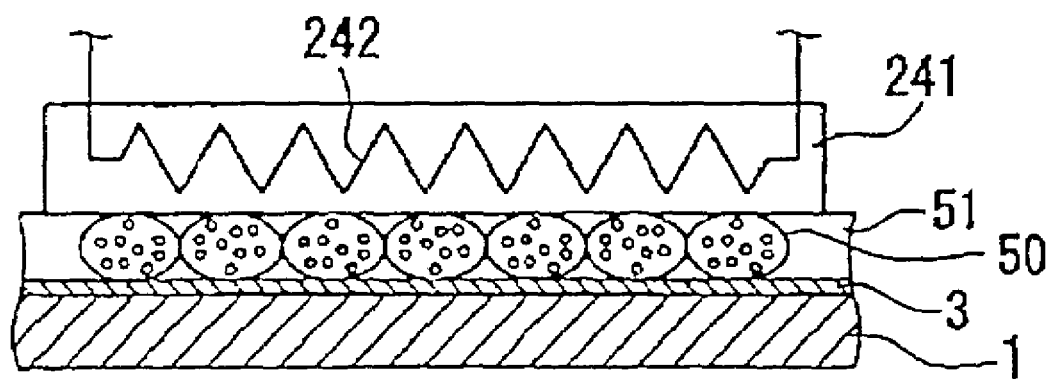
FIG. 19 is a schematic view, as is FIG. 18, showing a part of a manufacturing apparatus.

Next, as shown in (c) of the same figure, in a part of the wall film of each microcapsule 50, which is at the side opposite to the electrode 3, openings are formed by various technique as described below. As the technique for forming the openings in the wall films, in accordance with a material for the microcapsule 50, an optional technique using, for example, heat, mechanical stress, light, sonic waves, solvents, or corrosive gas, may be used. For example, FIG. 17 is a schematic view showing a step in which the openings are mechanically formed in the wall films of the microcapsules 50 by needle-shaped projections 231. FIG. 18 is a schematic view showing a step in which the openings are formed by heat application. In this case, the microcapsules 50 are each heated partly by a heater 241 provided with a resistive heating wire 242.

Next, as shown in (d) of the same figure, by an appropriate technique, the binding agent 51 is contracted. In this step, as a tool for performing this contraction, in accordance with a material for forming the binding agent 51, volatility of a solvent, heat, mechanical stress, or the like is used. In this contraction step, since an opening area formed in the wall film of each microcapsule 50 is largely expanded, the wall films at the observer side are removed, and in addition, the gaps between the microcapsules are decreased, resulting in significant improvement in image contrast.

In the step described above, the step of forming the opening in the wall film of each microcapsule 50 and the step of performing the contraction of the binding agent 51 may be simultaneously performed. In this case, a technique used for the opening-forming step for the wall film is preferably the same as that used for the contraction step.

In addition, in this contraction step, the microcapsules 50 may be deformed. In particular, when the microcapsule wall films at the electrode 3 side are flattened by the contraction of the binding agent 51 provided in the vicinity of the electrode, it is preferable in terms of the improvement in image contrast.

As shown in (e) of the same figure, the second substrate 2 is finally provided (laminated) on a large number of the microcapsules 50 so that the electrode 4 is located at the microcapsules 50 side. In this step, in order to prevent the electrode 4 and the electrophoretic dispersion 10 from being brought into direct contact with each other, an insulating film may be formed on the surface of the electrode 4.

EXAMPLE 2

Next, a method for manufacturing an electrophoretic device according to a second embodiment of the present invention will be described. In the first embodiment, after the microcapsules 50 and the binding agent 51 are provided on the electrode 3, the opening-forming step for the wall films of the microcapsules and the contraction step for the binding agent 51 are performed, and the electrode 4 is then provided.

However, in this second embodiment, the microcapsules 50 and the binding agent 51 are accommodated beforehand between the electrodes 3 and 4, and in the state described above, the opening-forming step for the wall film of the microcapsule and the contraction step for the binding agent are performed. In this manufacturing method, the opening-forming technique may use heat, mechanical stress, light, sonic waves, or the like, and the contraction technique may use heat, mechanical stress, light, or the like.

According to this second embodiment, prior to the opening-forming step for the microcapsule wall film and the contraction step for the binding agent, since the microcapsules and the binding agent are accommodated between the electrodes, leakage of the dispersion and intrusion of impurities can be avoided.

Figure 4:
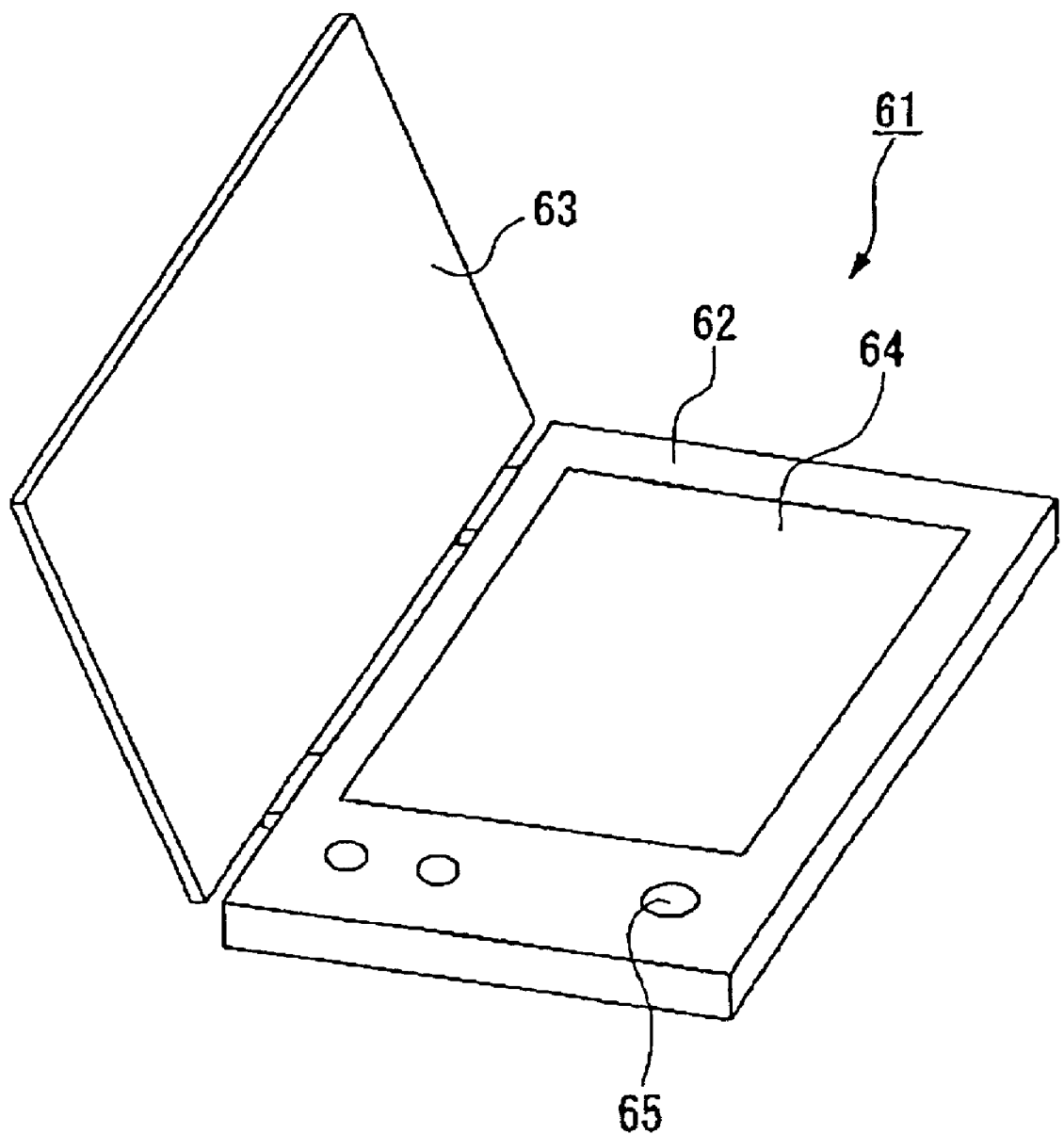
FIG. 4 is a perspective view showing the external structure of an electronic book as an example of an electronic apparatus of the present invention.

Next, the structure of an electronic book, which is an embodiment of an electronic apparatus according to the present invention, will be described with reference to FIG. 4. This electronic book 61 is formed so that data of books of electronic publication, the data being stored in memory media such as CDROM's, is displayed on a display screen of a display device for reading, and as the display device therefor, the electrophoretic display device described above is used. Accordingly, as shown in FIG. 4, the electronic book 61 has a book-shaped frame 62 and a cover 63 which is capable of opening and closing and which is provided on this frame 62. On the frame 62, there are provided an operation portion 65 and a display device 64 having a display surface in an exposed state on a surface thereof.

Figure 5:
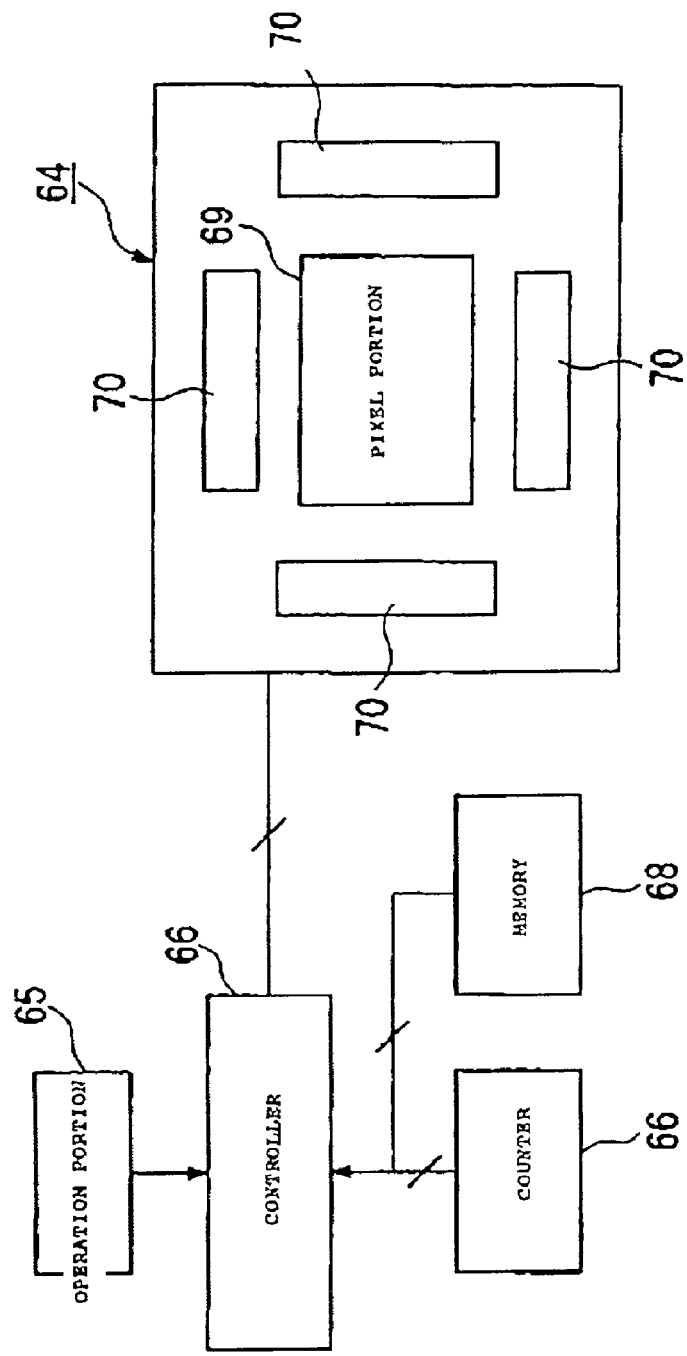
FIG. 5 is a block diagram showing the electrical structure of the electronic book.

Inside the frame 62, as shown in FIG. 5, there are provided a controller 36, a counter 37, a memory 38, a data reader (not shown in the figure) for reading data in a memory medium such as a CDROM, and the like.

The display device 64 according to this embodiment comprises a pixel portion 69 having the structure formed of the electrophoretic display device 20 as shown in FIG. 1, and peripheral circuits 70 which are provided together with the pixel portion 69 and which are integrated. In the peripheral circuits 70, a decoder type scan driver and data driver are provided.

As long as being provided with the display device 64 having the structure formed of the electrophoretic display device, the electronic apparatus of the present invention is not limited to the electronic book described in the above embodiment. Hereinafter, some other examples of the electronic apparatuses provided with this display device 64 will be described.

<Mobile Computer>

Figure 6:
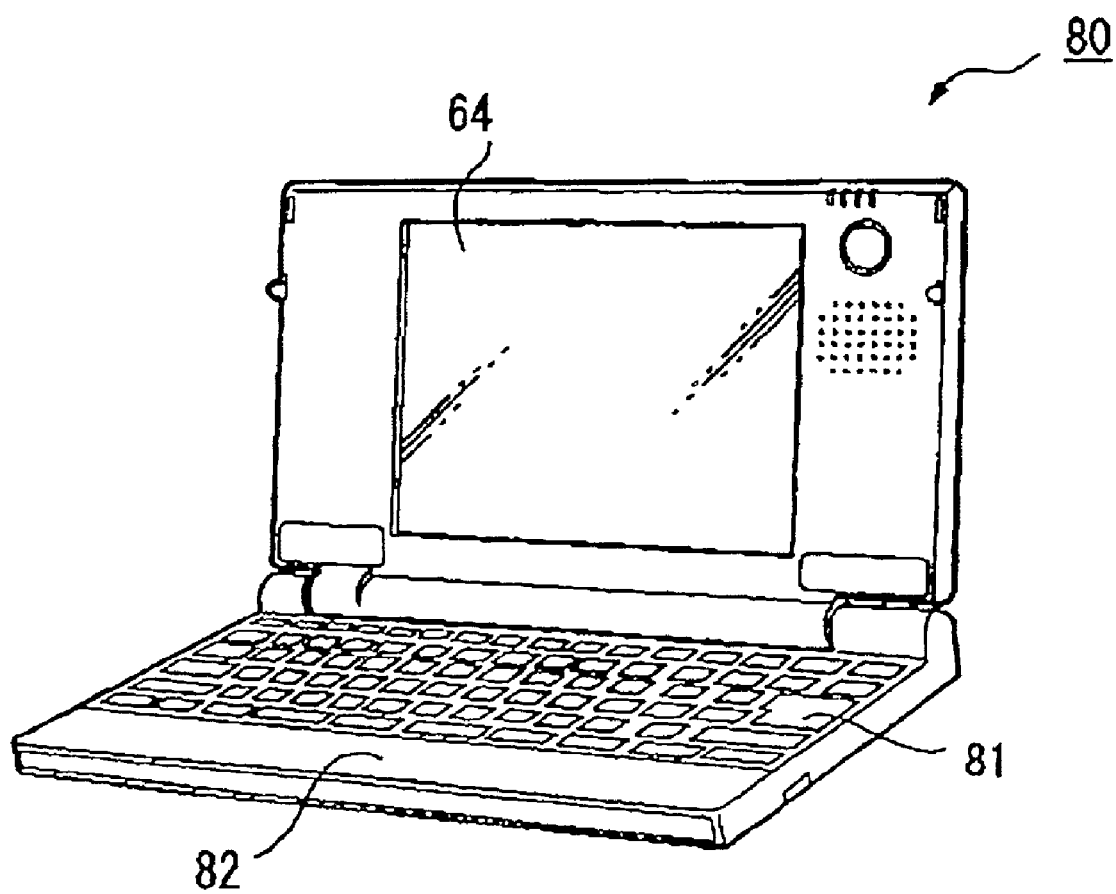
FIG. 6 is a perspective view showing the external structure of a computer as an example of an electronic apparatus of the present invention.

An example in which the display device 64 described above is applied to a display portion of a mobile computer will first be described. FIG. 6 is a perspective view showing the structure of this personal computer. As shown in FIG. 6, a personal computer 80 is formed of a main body 82 including a keyboard 81, and a display unit including the display device 64 described above.

<Mobile Phone>

Figure 7:
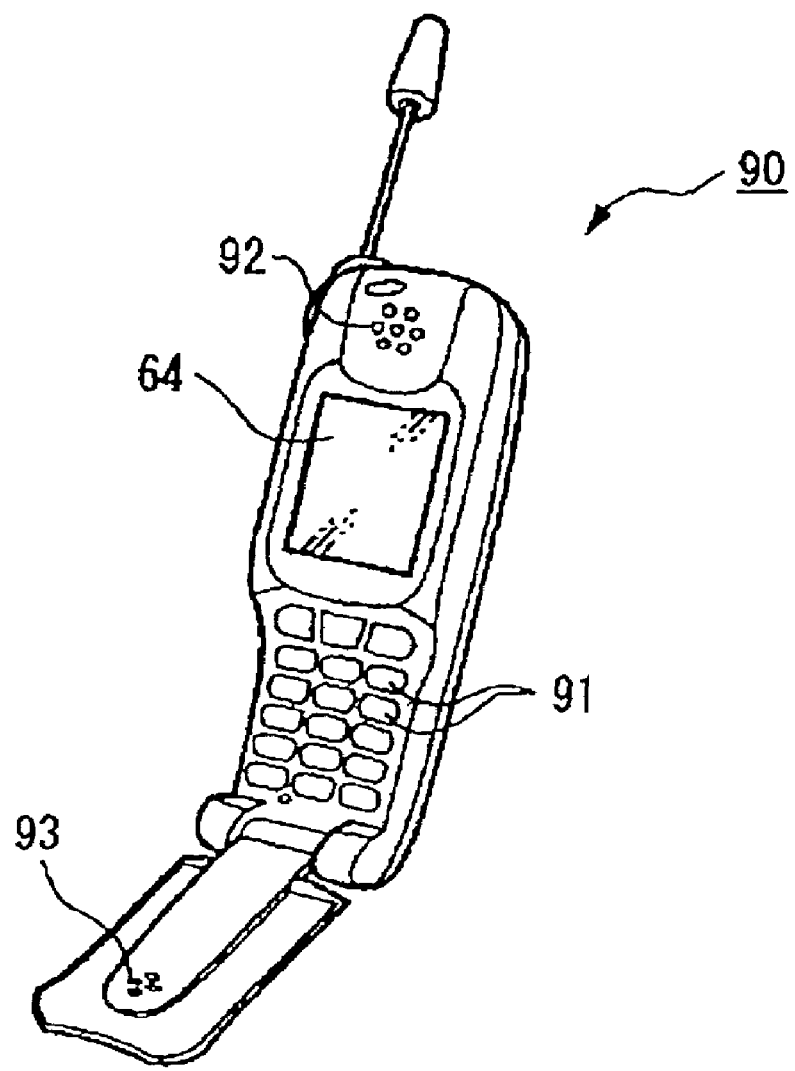
FIG. 7 is a perspective view showing the external structure of a mobile phone as an example of an electronic apparatus of the present invention.

Next, an example in which the display device 64 described above is applied to a display portion of a mobile phone will be described. FIG. 7 is a perspective view showing the structure of this mobile phone. As shown in FIG. 7, in addition to a plurality of operation buttons 91, this mobile phone 90 includes the display device 64 described above together with an earpiece 92 and mouthpiece 93.

<Digital Still Camera>

Figure 8:
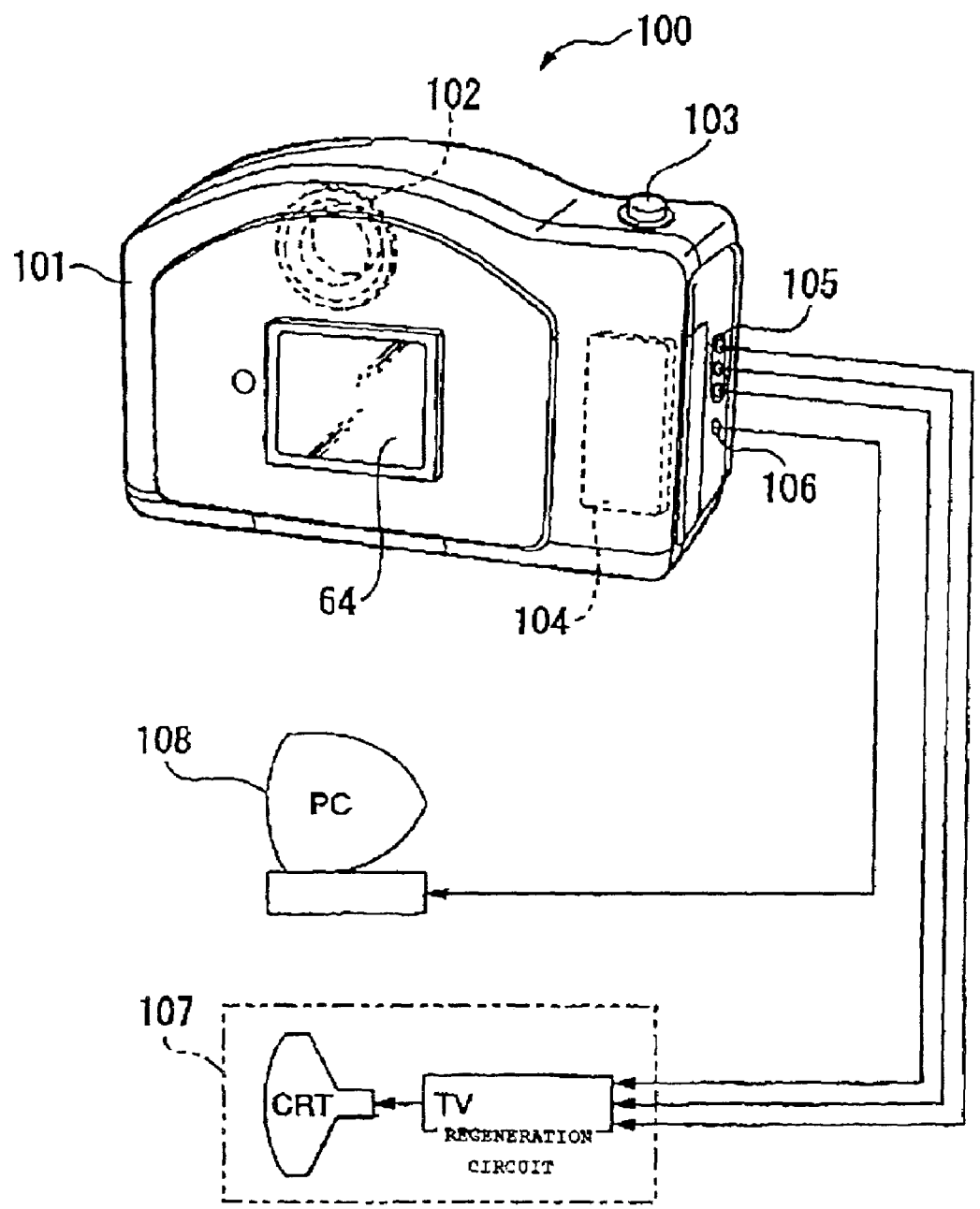
FIG. 8 is a perspective view showing the external structure of a digital still camera as an example of an electronic apparatus of the present invention.

Furthermore, an example in which the display device 64 described above is used as a viewfinder for a digital still camera will be described. FIG. 8 is a perspective view showing the structure of this digital still camera, and in addition, connections with external apparatuses are also shown briefly.

Although general cameras expose films by light images of objects, a digital still camera 100 generates an image signal by photoelectric conversion of a light image of an object using an imaging device such as a CCD (Charged Coupled Device).

On the rear surface of a case 101 of the digital still camera 100, the display device 64 described above is provided, and display is performed in accordance with image signals supplied by the CCD. Accordingly, the display device 64 serves as a viewfinder for displaying an object. In addition, at the observer side (rear surface side in the figure) of the case 101, a light-receiving unit 102 including optical lenses, the CCD, and the like is provided.

When a picture taker recognizes an object image displayed in the display device 64 and then presses a shutter button 103, an image signal of the CCD at the same time is transferred to and stored in a memory of a circuit board 104.

In this digital still camera 100, on the side surface of the case 101, a video signal output terminal 105 and a data communication input-output terminal 106 are provided. In addition, as shown in the figure, the former, the video signal output terminal 105, and the latter, the data communication input-output terminal 106, are connected to a television monitor 108 and a personal computer 108, respectively, when necessary. In addition, in response to predetermined operations, the image signal stored in the memory of the circuit substrate 104 is output to the television monitor 107 or the personal computer 108.

<Electronic Paper>

Figure 9:
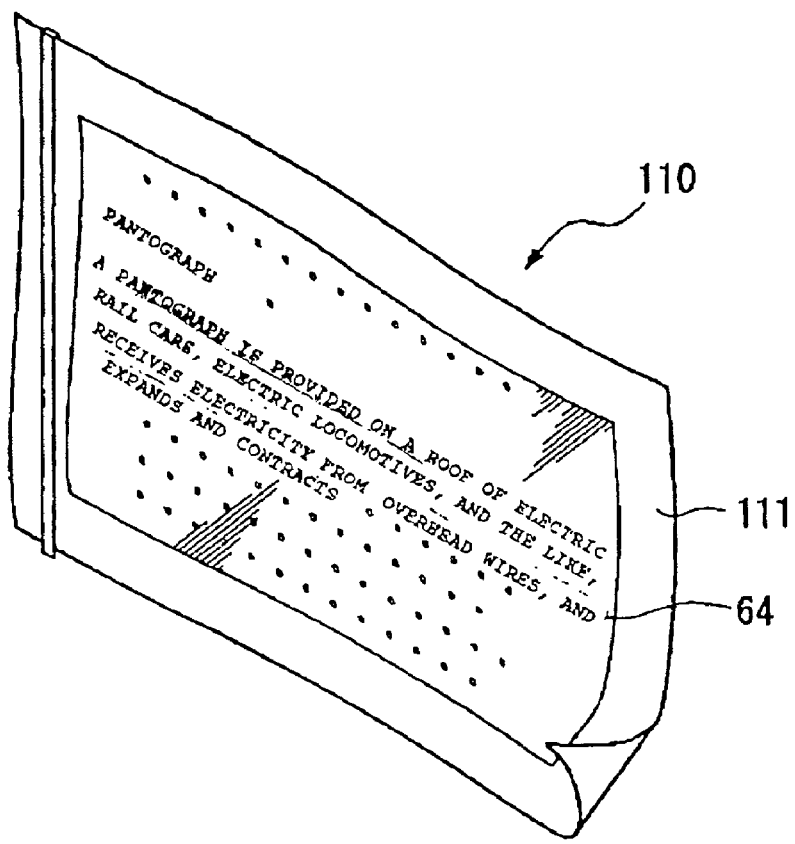
FIG. 9 is a perspective view showing the external structure of electronic paper as an example of an electronic apparatus of the present invention.

Next, an example in which the display device 64 described above is applied to a display portion of electronic paper will be described. FIG. 9 is a perspective view showing the structure of this electronic paper. This electronic paper 110 is formed of a main body 111, which is composed of a rewritable sheet having the texture and flexibility similar to those of paper, and a display unit incorporating the display device 64 described above.

<Electronic Note>

Figure 10:
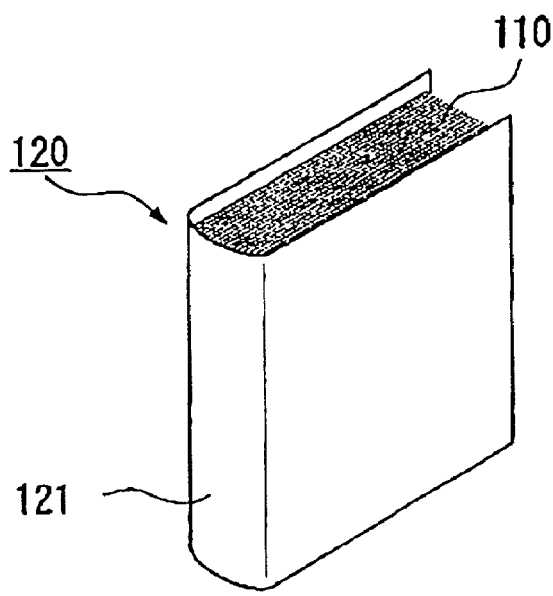
FIG. 10 is a perspective view showing the external structure of an electronic notebook as an example of an electronic apparatus of the present invention.

In addition, FIG. 10 is a perspective view showing the structure of an electronic notebook. As shown in FIG. 10, this electronic notebook 120 comprises a stack of electronic paper 110 shown in FIG. 9 and a cover 121 which is folded in half so as to sandwich the stack of electronic paper 110. When the cover 121 is provided with display data input means, the display content can be changed while the electronic paper is in a stacked state.

As described above, according to the embodiments of the electronic apparatuses of the present invention, as the display device 64, an electrophoretic display device as shown in FIG. 1 is used. As a result, although the electrophoretic display device is used, a display device having significantly improved image contrast can be obtained.

As the electronic apparatuses described above, in addition to the electronic book in FIG. 4, the personal computer in FIG. 6, the mobile phone in FIG. 7, the digital still camera in FIG. 8, and the electronic paper in FIG. 9, for example, there may be mentioned liquid crystal televisions, viewfinder type and direct viewing type video tape recorders, car navigation apparatuses, pagers, electronic pocketbooks, electronic calculators, word processors, workstations, television phones, POS terminals, and apparatuses provided with touché panels. In addition, as display portions of the electronic apparatuses mentioned above, the above display device may be naturally used.

Next, a modified example of the structure of the electrophoretic display device shown in FIG. 1 will be described.

Figure 11:
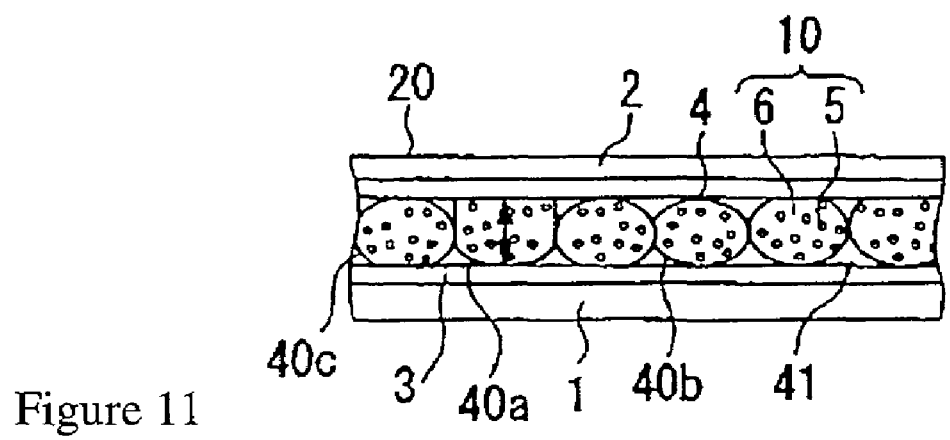
FIG. 11 is a cross-sectional view showing one modified example of the electrophoretic device shown in FIG. 1.

FIG. 11 is a view showing an example of an electrophoretic device comprising microcapsules 40a each having an opening portion at the second substrate 2 side as in the case shown in FIG. 1, microcapsules 40b each having an opening portion facing in a perpendicular direction with respect to the substrates 1 and 2, and microcapsules 40c each having opening portions at both the first substrate 1 and the second substrate 2 sides. As described above, in the electrophoretic device, when each microcapsule has an opening portion formed in at least a part thereof, the gap between the microcapsules is decreased at that part mentioned above, and hence at least the contrast decrease can be avoided or suppressed. In this case, as in the example shown in FIG. 1, it is assumed that the electric field is applied in a longitudinal direction, and the electrophoretic particles 5 are moved in the longitudinal direction.

Figure 12:
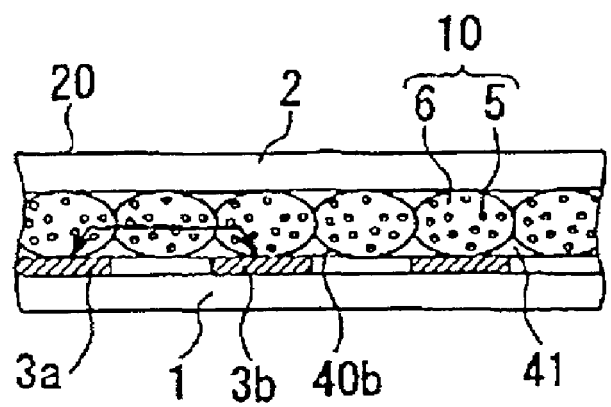
FIG. 12 is a cross-sectional view showing another modified example of the electrophoretic device shown in FIG. 1.

FIG. 12 is a view showing an example of an electrophoretic device comprising microcapsules 40b each having an opening portion facing in the perpendicular direction with respect to the substrates 1 and 2. In this case, for example, in an electrophoretic device in which a lateral electric field is applied, since resistance components are decreased at least at the opening portions facing in the lateral direction, voltage application can be advantageously performed. In the example shown in FIG. 12, it is assumed that the electric field is applied in the lateral direction (direction indicated by the arrow in the figure) between the electrodes 3a and 3b formed on the first substrate 1, and the electrophoretic particles 5 are moved in the lateral direction.

Figure 13:
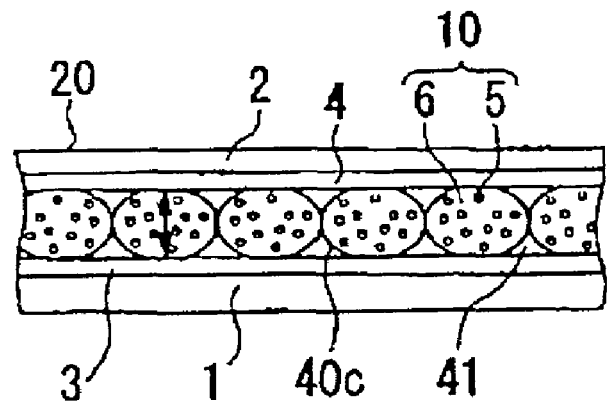
FIG. 13 is a cross-sectional view showing another modified example of the electrophoretic device shown in FIG. 1.

As shown in FIG. 13, an electrophoretic device comprising the microcapsules 40c each having opening portions at the first and the second substrate 1 and 2 sides may also be formed. In addition, the structure in which an insulating film is provided between the opening portions and the electrode 3 or 4 may also be formed. In this case, adhesion of the electrophoretic particles 5 to the electrode 3 or 4 can be avoided.

Figure 14:
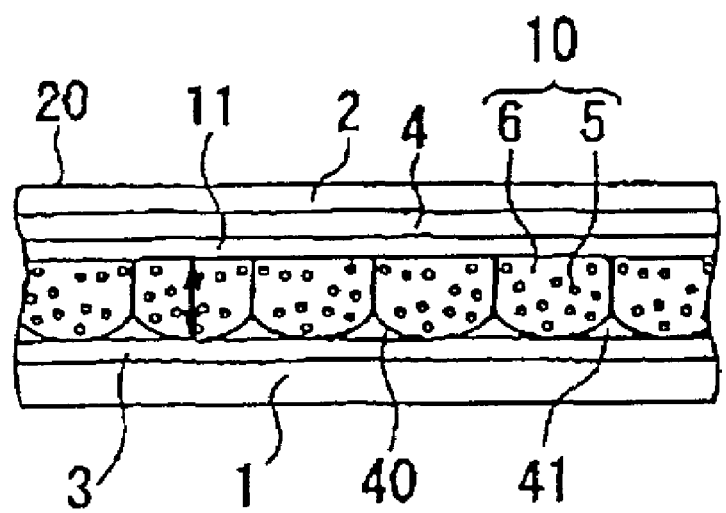
FIG. 14 is a cross-sectional view showing another modified example of the electrophoretic device shown in FIG. 1.

In addition, as shown in FIG. 14, an insulating layer 11 may be provided between the opening portions and the electrode (the electrode 4 in FIG. 14) at which the opening portions exist. In this case, adhesion of the electrophoretic particles 5 to the electrode at which the opening portions exist can be avoided or suppressed.

Next, an embodiment in which the electrophoretic device of the present invention is applied to an active matrix electrophoretic display device will be described. FIG. 16 is a plan view showing an electrophoretic display device. In addition, FIG. 15 is a view showing the cross-sectional structure taken along the line A–A' in FIG. 16.

An electrophoretic device 20B shown in these figures is formed of the first substrate 1, the second substrate 2 disposed to oppose thereto, and an electrophoretic layer (electrooptic layer) 21 provided therebetween. At the internal surface side of the second substrate 2 (at the electrooptic layer 21 side), a color filter layer 12, a common electrode 4, and an insulating layer 11 are formed. At the internal surface side of the first substrate 1 (at the electrooptic layer 21 side), an elemental portion 27 including a plurality of pixel electrodes 3 and the like is formed. At the second substrate 2 side, the second substrate 2, the common electrode 4, and the insulating layer 11 have light transmissive properties, and the external surface of the second substrate 2 serves as a display surface of this electrophoretic device 20B. Although not shown in the figure, on the first substrate 1 having the elemental portion 27, various peripheral circuits for driving and controlling the elemental portion 27 may be formed. In addition, in this embodiment, the common electrode 4 is formed at the second substrate 2 side, and the elemental portion 27 is formed at the first substrate 1 side; however, the elemental portion 27 may be formed at the second substrate 2 side.

The second substrate 2 may be formed of a substrate having light transparency such as a transparent glass or film. Although not being necessary to be transparent, the first substrate 1 may be formed, for example, of a glass substrate or resin film. In addition, the color filter layer 12 has the structure including color layers (R, G, B) corresponding to red, blue, and green, and BM layers provided between the respective color layers (R, G, B). In addition, the insulating layer 11 is primarily formed of a transparent, insulating film including $SiO_2$ or the like.

Figure 15:
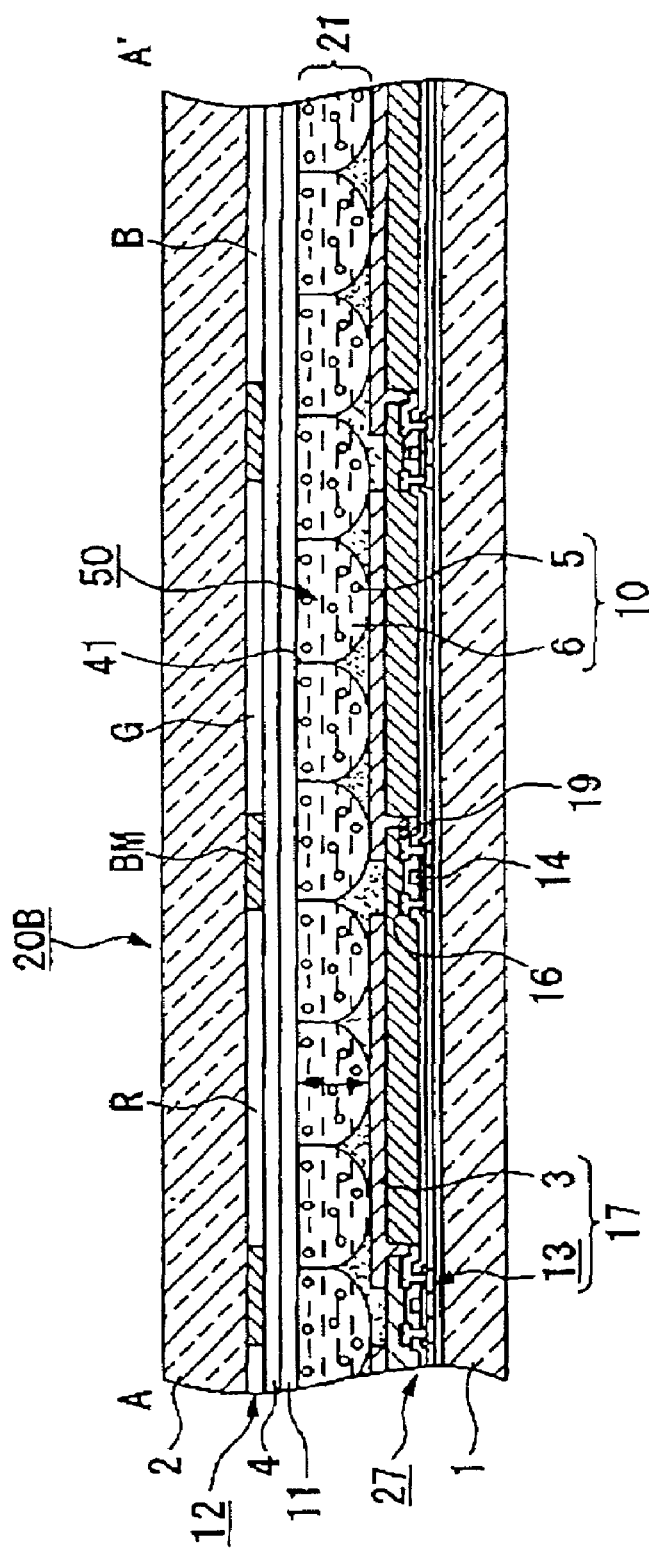
FIG. 15 is a cross-sectional view showing an example in which an electrophoretic device of the present invention is applied to an active matrix electrophoretic display device.
Figure 16:
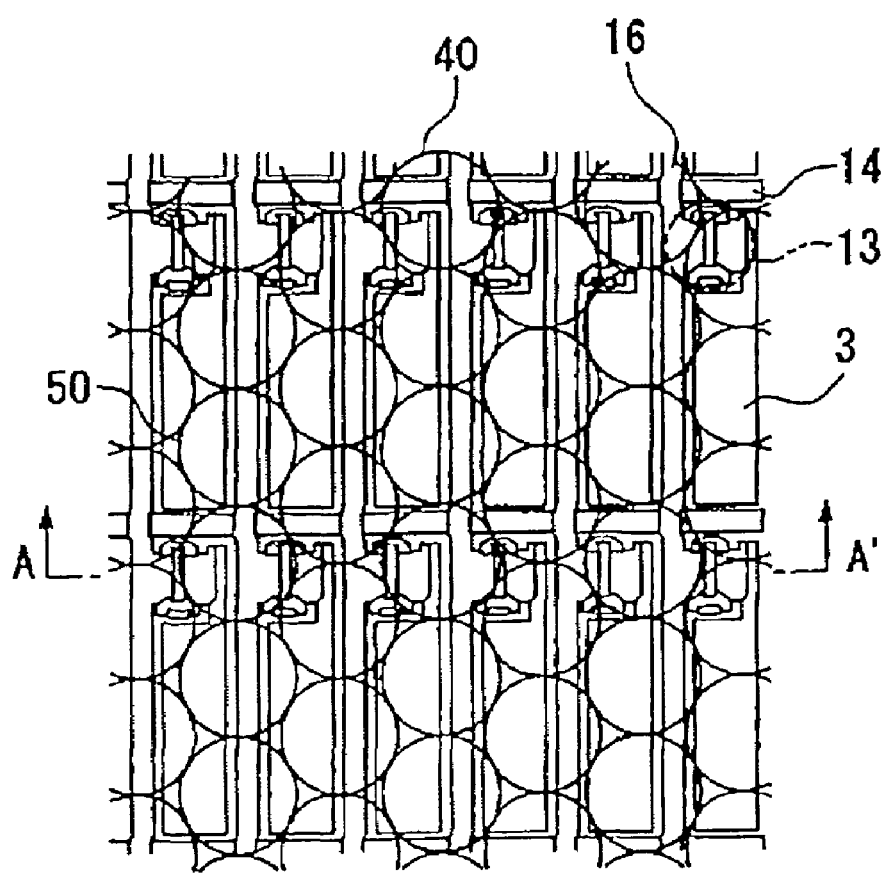
FIG. 16 is a plan view, as is FIG. 15, showing an example in which an electrophoretic device of the present invention is applied to an active matrix electrophoretic display device.

As shown in FIG. 15, the electrophoretic layer 21 has the structure in which a plurality of the electrophoretic particles 5 are dispersed in the dispersing medium 6 accommodated in the microcapsules 50. The microcapsules 50 have the opening portions provided at the insulating layer 11 side. In more particular, the opening portions of the microcapsules are formed so as to be in contact with the insulating layer 11, that is, the openings are provided in the electric field direction (direction indicated by the arrow in the figure) of the electrophoretic display device 20B. Concerning the dispersion medium 6 and the electrophoretic particles 5, the same configurations as those used in the electrophoretic display device of the embodiment shown in FIG. 1 may be used.

FIG. 16 is a plan view showing a plurality of the pixel portions 17 (pixel electrodes 3 and TFT elements 13), data lines 16, scanning lines 14, and the like, which are arranged in a matrix and which form an image display region of the electrophoretic display device 20B of this embodiment. According to the electrophoretic display device 20B of this embodiment, in each of a plurality of display units which are arranged in a matrix and which form the image display region, there are provided the pixel electrode 3 functioning as a transparent conductive layer and the TFT element 13 for controlling electricity supplied to the pixel electrode 3, and the data line 16 to which an image signal is supplied is electrically connected to the source of the TFT element 13. The image signals to be stored in the data lines 16 are supplied in a line-sequential manner thereto or are supplied to each group formed of a plurality of neighboring data lines 16.

In addition, as shown in FIG. 15, the scanning lines 14 are electrically connected to the gates of the TFT elements 13, and scanning signals are applied pulsewise in a line-sequential manner to the plurality of the scanning lines 14 with predetermined timing. In addition, the pixel electrodes 3 are electrically connected to the drain electrodes 19 of the TFT elements 13, and by placing the TFT elements 13 in an ON-state for a predetermined period of time, image signals are stored, which are supplied from the data lines 16, with predetermined timing. An image signal having a certain level stored in the pixel electrode 3 is maintained with the common electrode 4 for a predetermined period of time. The electrophoretic particles 5 having charges are attracted to one of the pixel electrode 3 and the common electrode 4, whichever has a polarity opposite to that of the particles, and hence grayshade display can be performed by the contrast between the charged particle color and the dispersion medium color.

As shown in FIG. 16, on the first substrate 1, a plurality of the pixel electrodes 3 is provided in a matrix, and the data lines 16 and the scanning lines 14 are provided along the longitudinal and lateral boundaries of pixel electrodes 3, respectively. In this embodiment, display areas formed in regions surrounded by the data lines 16 and the scanning lines 14 are display units (dots), the configuration is formed so that display can be performed in each of the display units arranged in a matrix, and a plurality of the microcapsules 50 is provided in each dot.

Next, the structure of the microcapsule 50 applicable to the embodiments described above will be described. FIG. 17 is a cross-sectional view of a microcapsule having the structure in which the capsule wall film 40, and the dispersion medium 6 and the electrophoretic particles 5, which are filled inside the wall film 40, are provided. The dispersion medium 6 is formed including a coloring material, and the coloring material contained in the dispersion medium 6 filled inside the wall film may color the wall film 40.

When the microcapsules 50 described above, each having an opening in at least a part thereof, are provided in an electrophoretic display device, the electrophoretic display devices of the embodiment described above can be provided.

Advantages

As has thus been described the electrophoretic device of the present invention comprises the plurality of the capsules which contain the dispersion medium and the electrophoretic particles and which are provided between the first substrate and the second substrate, wherein each capsule has an opening formed in at least a part thereof. Accordingly, the resistance component at the opening portion is decreased, and an effect of advantageously applying voltage can be obtained. In addition, since gaps formed between the capsules are unlikely to be formed at least at the opening portions, an advantage of improvement in image contrast can be obtained.

What is claimed is:

1. An electrophoretic device comprising:
   a first substrate;
   a second substrate opposing the first substrate; and
   a plurality of capsules provided between the first substrate and the second substrate and containing a dispersion medium and electrophoretic particles, each of the plurality of capsules including an outer wall that directly contacts another outer wall of an adjacent capsule;
   wherein each of the capsules of the plurality of capsules each have an opening formed in at least a part thereof.

2. An electrophoretic device according to claim 1, further comprising a binding agent around peripheries of the capsules.

3. An electrophoretic device according to claim 1, wherein the opening formed in each of the capsules is at least in contact with one of the first substrate and the second substrate.

4. An electrophoretic device according to claim 1, wherein the opening of each of the capsules faces in a direction parallel to an electric field direction.

5. An electrophoretic device according to claim 1, wherein the capsules each have a smaller diameter in a perpendicular direction with respect to a major axis of the first substrate than a diameter in a parallel direction with respect to the major axis of the first substrate.

6. An electrophoretic device according to claim 1, wherein the first substrate has light transmissive properties, and the openings of the capsules are provided at the first substrate side.

7. An electrophoretic device according to claim 6, further comprising:
   a first electrode formed at an internal surface side of the first substrate; and
   an insulating film formed between the first electrode and the openings of the capsules.

8. An electrophoretic device according to claim 6, wherein the each of the capsules has no opening at a second substrate side.

9. An electrophoretic device according to claim 6, further comprising a color layer between the openings of the capsules and the first substrate.

10. An electronic apparatus having an image display portion, comprising: an electrophoretic device according to claim 1 as the image display portion.

11. An electrophoretic device comprising scanning lines, signal lines, and switching elements provided at respective intersections therebetween, comprising:
- a first substrate;
- a second substrate opposing the first substrate, the switching elements being provide on the second substrate; and
- capsules provided between the first substrate and the second substrate and containing a dispersion medium and electrophoretic particles, each of the capsules including an outer wall that directly contacts another outer wall of an adjacent capsule;
- wherein the capsules each have an opening formed in at least a part thereof at a first substrate side.

12. An electrophoretic device according to claim 11, further comprising:
- pixel electrodes provided on the second substrate and connected to the switching elements; and
- a counter electrode provided on the first substrate and opposing the pixel electrodes; wherein the counter electrode has light transmissive properties.

13. An electronic apparatus having an image display portion, comprising: an electrophoretic device according to claim 11 as the image display portion.

* * * * *